Jan. 30, 1945. M. GARANCHER 2,368,293
HOSE REEL
Filed March 1, 1941 7 Sheets-Sheet 1

Inventor
Marcel Garancher
By Williams, Bradbury & Hinkle
Attys.

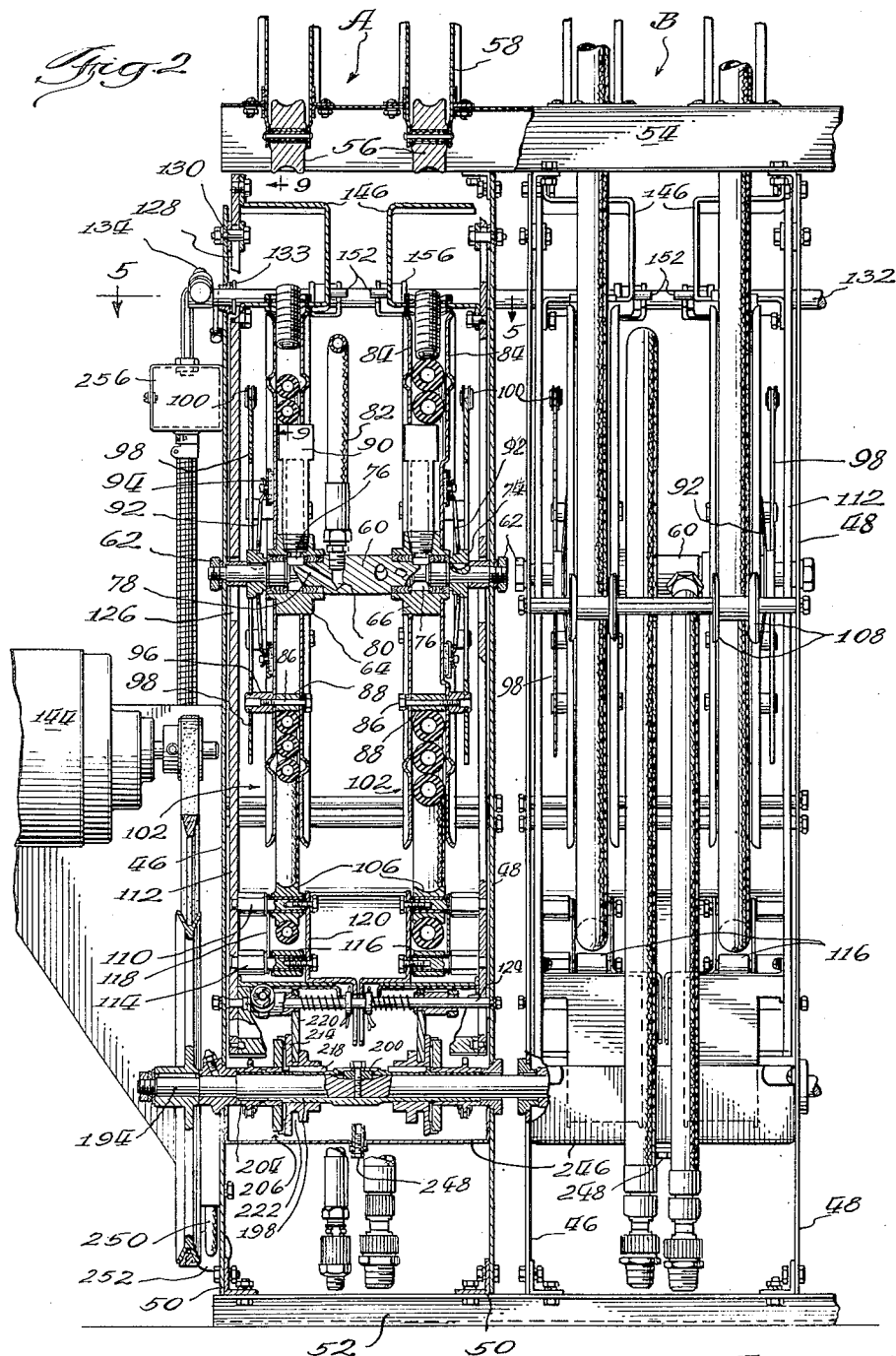

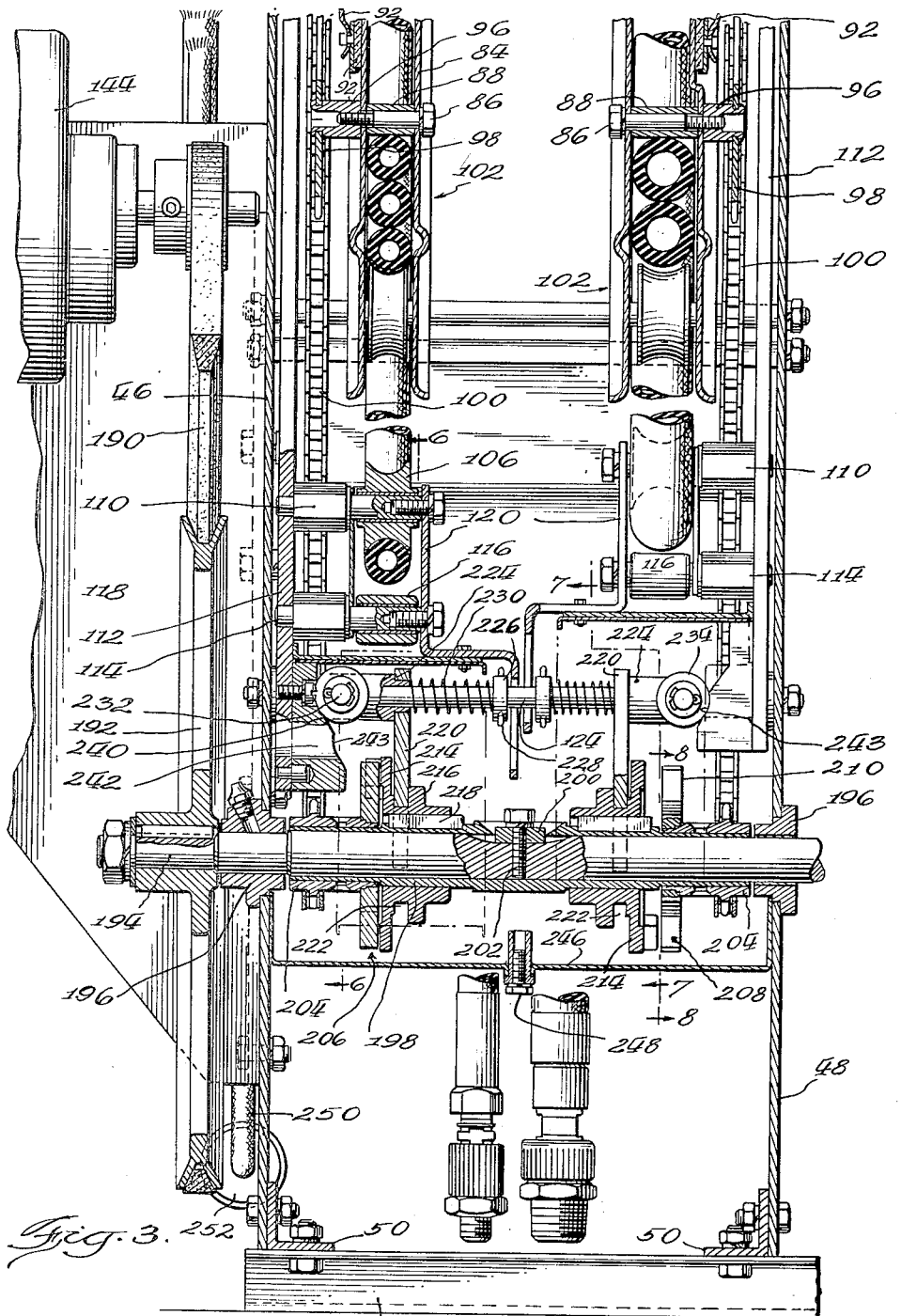

Jan. 30, 1945.　　　M. GARANCHER　　　2,368,293
HOSE REEL
Filed March 1, 1941　　　7 Sheets-Sheet 4
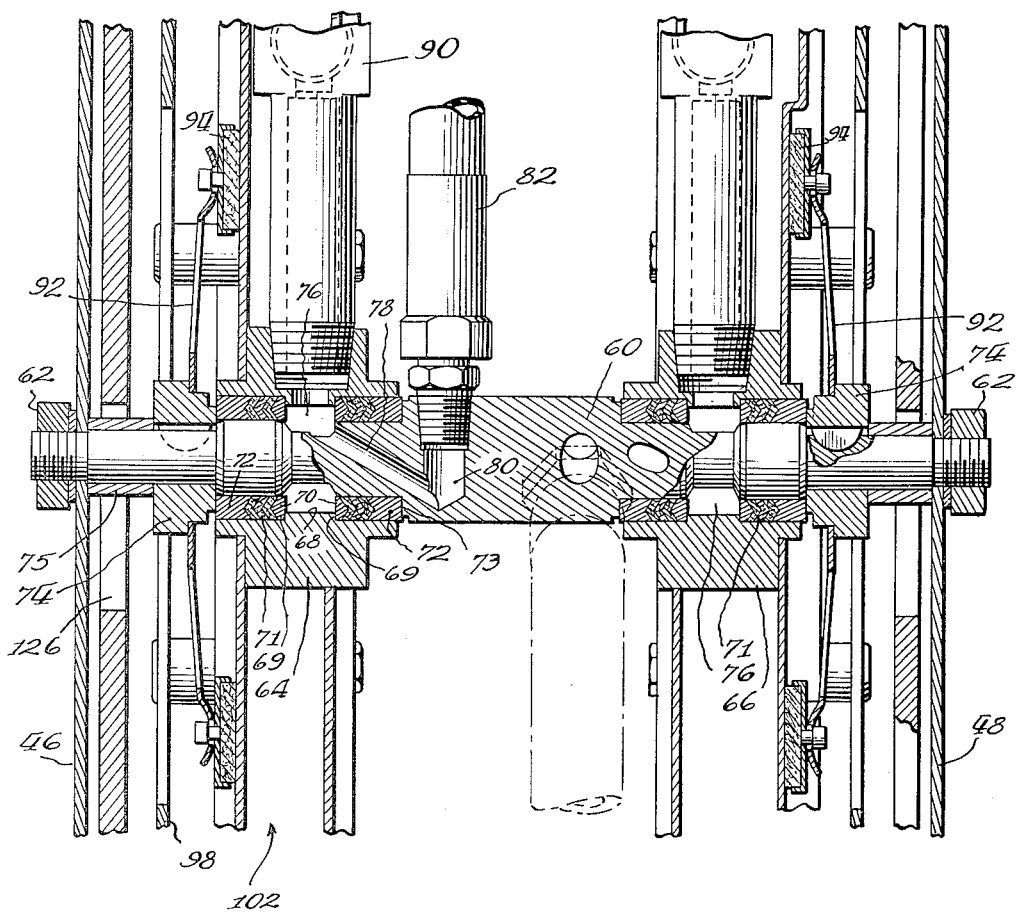
Fig. 3.A.
Inventor:
Marcel Garancher
By
Williams, Bradbury & Hinkle
Attys.

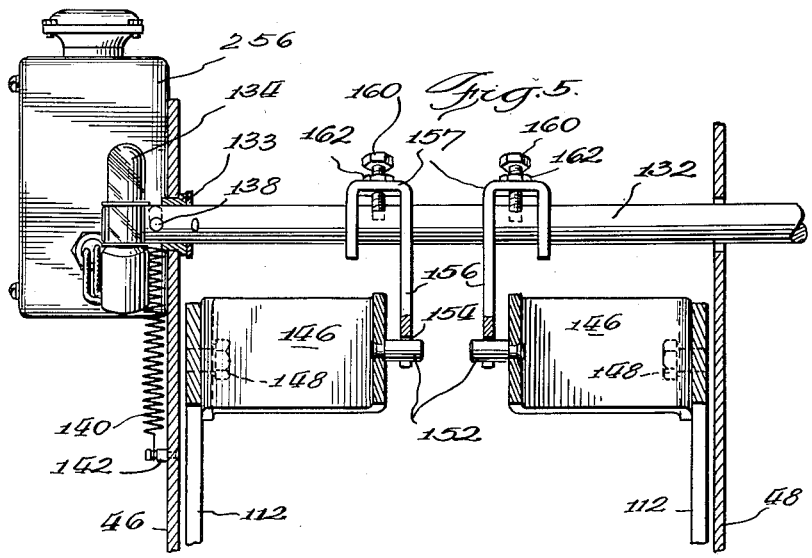
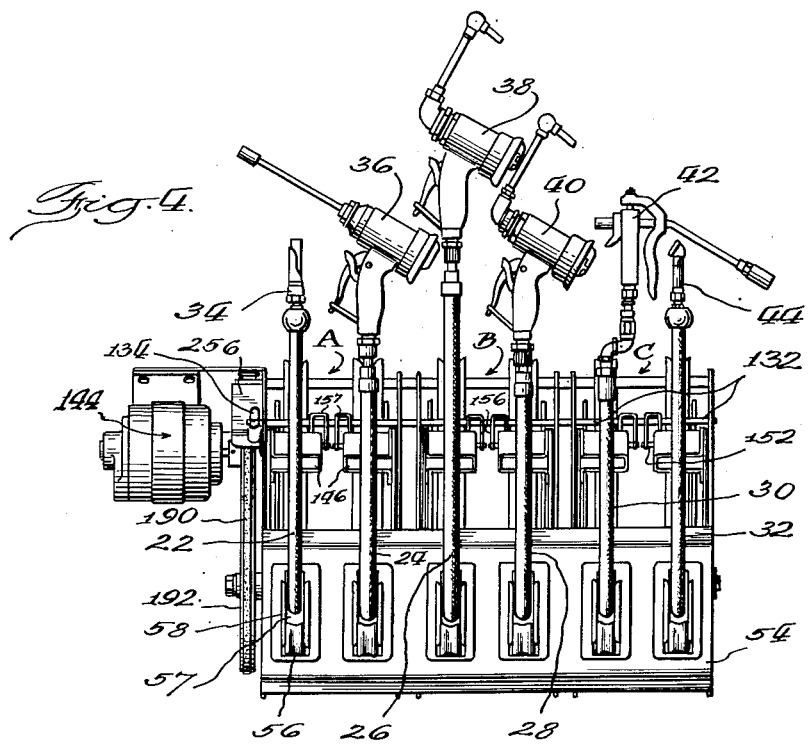

Jan. 30, 1945. M. GARANCHER 2,368,293
HOSE REEL
Filed March 1, 1941 7 Sheets-Sheet 6
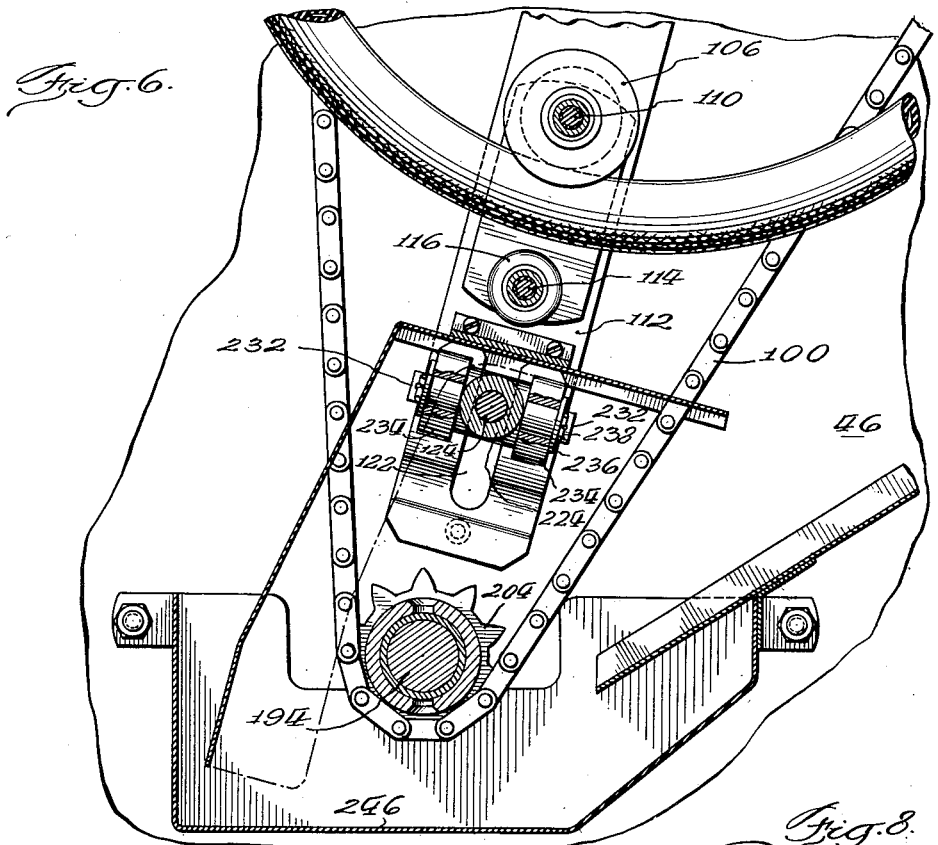
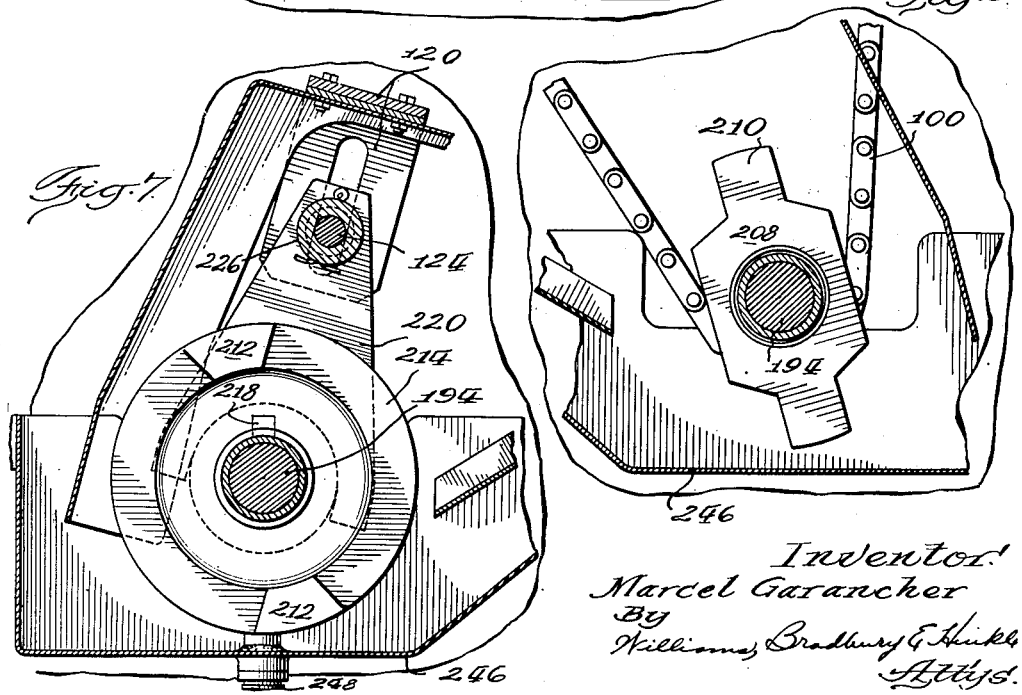
Inventor
Marcel Garancher
By
Williams, Bradbury & Hinkle
Attys.

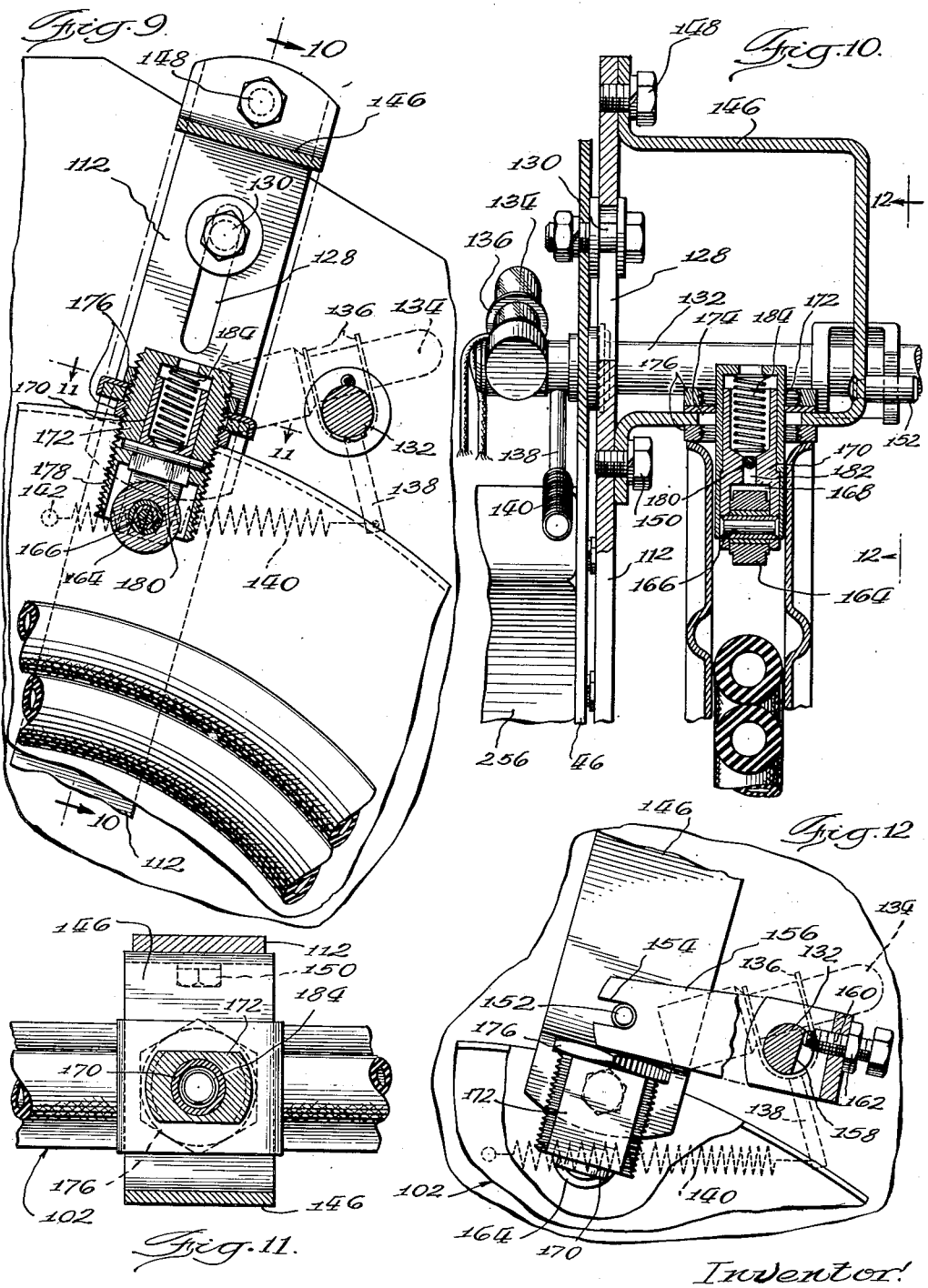

Patented Jan. 30, 1945

2,368,293

UNITED STATES PATENT OFFICE 2,368,293

HOSE REEL

Marcel Garancher, Chicago, Ill., assignor to Stewart-Warner Corporation, Chicago, Ill., a corporation of Virginia Application March 1, 1941, Serial No. 381,369

12 Claims. (Cl. 242—86)

This invention relates to hose reels and is more particularly concerned with the provision of an apparatus adapted for storing lengths of hose used in conjunction with lubricating and other equipment of the type commonly found at automobile service stations.

At the better equipped automobile service stations, it is common to have several lengths of hose which are used in conjunction with a variety of lubricating and other apparatus in the normal servicing of an automobile. For instance, it is usual to have a high pressure lubricating hose leading from a compressor to a coupler and valve. This high pressure hose and coupler is used for lubricating the major portion of the lubricating fittings of a modern automobile. Additional hose lengths are connected to supply engine oil and one or more types of gear oil. In addition to the above mentioned hoses intended to dispense lubricants, it is usual also to have a radiator filling water hose and a tire inflating air hose.

The illustrated embodiment of my invention discloses a hose cabinet adapted to store upon separate reels six different hose lengths. It will be appreciated, however, that the invention is not limited to use with any particular number of hose lengths, since in larger service stations it may be desirable to store more than six lengths of hose in an apparatus of the type comprising the present invention, while, in smaller service stations, a fewer number of hose lengths might be considered sufficient.

With the above in mind, it is an object of my invention to provide an improved hose cabinet for storing on separate reels a plurality of hoses of the type used in automobile service stations.

Another object of the invention is the provision of a novel automatic re-wind reel mechanism by means of which any one of several lengths of hose can be unwound or rewound to any desired extent.

Still another object of the invention is to provide an improved hose cabinet having a plurality of hose reels so arranged that the hose on any one of the reels can be rewound independently of the other hose lengths by a single electric motor common to all of the reels.

An additional object is the provision of a novel hose cabinet having a plurality of hose reels so arranged that the hose lengths upon the reels are permanently connected at their inner ends to a source of fluid supply.

Still another object of the present invention is the provision of an improved automatic re-wind hose reel which may be remotely controlled in a novel manner by means of the hose itself.

An additional object of the invention is the provision of an automatic re-wind hose reel having control means affected by the hose such that the hose may be pulled freely from the cabinet and will remain in its extended position even though the hose may become slack thereafter, but which will re-wind the hose when the hose is subjected to a slight momentary jerk and which will cease re-winding the hose after the slack has been taken up.

Still another object of the present invention is to provide a novel hose storing and retrieving cabinet having the above characteristics and which is so constructed that it will not be likely to be subject to breakdowns in service.

Yet another object of the present invention is to provide an improved hose cabinet having the above desirable features and which is adapted to be constructed in units which may be easily assembled to form cabinets of different sizes, so that, for instance, a hose cabinet adapted to contain two hose lengths can be put into service and at a later date, additional cabinets to contain additional lengths of hose can be added to the first unit without the necessity for supplying a separate motor and drive arrangement for the additionally supplied units.

Other objects and advantages will appear from the following description of a preferred embodiment of my invention, reference being had to the accompanying drawings in which:

Fig. 1 is a side elevation of a hose cabinet embodying the features of the present invention;

Fig. 2 shows the motor drive end of the hose cabinet shown in Fig. 1 and consists of two units of two reels each connected together to be driven by a single motor. Of these two units, the one to the left may be considered as shown in oblique section, the view being taken in the direction of the arrows substantially along the line 2—2 of Fig. 1. The right-hand portion of Fig. 2 may be considered as a rear elevation of one of the units of the device;

Fig. 3 is an oblique sectional view taken in the direction of the arrows along the line 3—3 of Fig. 1 and may be considered as the left-hand lower portion of Fig. 2 drawn to a larger scale:

Fig. 3A is an oblique sectional view taken in the same plane as Fig. 3 and shows a portion of the structure immediately above the portion illustrated in Fig. 3. It may be considered as taken in the direction of the arrows along the line 3A—3A of Fig. 1;

Fig. 4 is a plane view of a hose cabinet adapted to store six hose lengths and is shown with the hoses withdrawn slightly from the cabinet in order better to illustrate a representative group of automobile servicing attachments connected to these hose lengths;

Fig. 5 is a horizontal sectional view taken along the line 5—5 of Fig. 2 looking downwardly as indicated by the arrows. This view illustrates principally a detail of the motor switch and associated control mechanism;

Fig. 6 is a sectional view taken in the direction of the arrows along the lines 6—6 of Fig. 3 and illustrates on an enlarged scale a detail of the drive mechanism;

Fig. 7 is a sectional view taken in the direction of the arrows along the line 7—7 of Fig. 3 and illustrates a portion of the clutch mechanism on an enlarged scale;

Fig. 8 is a sectional view taken in the direction of the arrows along the line 8—8 of Fig. 3 and illustrates another component of the clutch mechanism on the same scale as Fig. 7;

Fig. 9 is a vertical sectional view taken in the direction indicated by the arrows along the line 9—9 of Fig. 2 and illustrates a portion of the switch control mechanism;

Fig. 10 is a sectional view taken in the direction of the arrows along the line 10—10 of Fig. 9;

Fig. 11 is a sectional view taken in the direction of the arrows along the line 11—11 of Fig. 9 and shows a detail of the motor switch control; and Fig. 12 is a vertical sectional view taken in the direction of the arrows along the line 12—12 of Fig. 10 and shows a portion of the switch control mechanism in side elevation.

Figure 1:
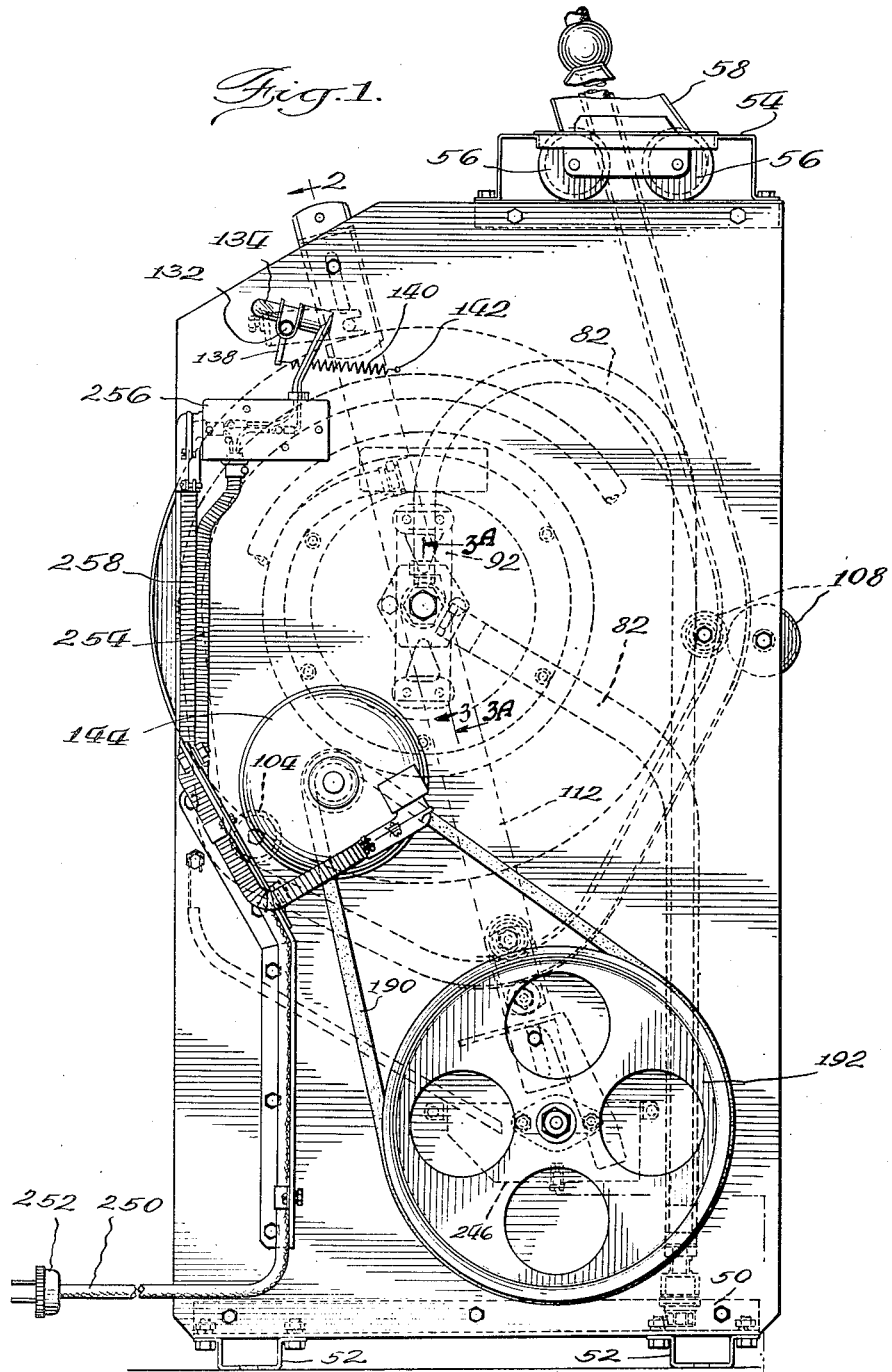

In general, my hose cabinet comprises a motor driven line shaft which extends through a plurality of (in the present instance three) individual hose cabinets. Each of these cabinets is provided with two reels and each of these reels may be individually connected to the shaft by means of individual sprockets and chains and a clutching arrangement for connecting one of the sprockets to rotate with the line shaft. Thus, by engagement of one of these clutches, the rotating shaft can be connected to drive the particular reel with which the clutch is associated so as to wind the hose length upon this reel.

In each instance, the inner end of the hose length is connected to a fitting at the center of the reel which in turn is connected to a fluid supply line by means of conduits, including a rotary seal. An arrangement is also provided for completing the electric circuit to the motor when any one of the before-mentioned clutches is engaged. The disengagement of each of these clutches is controlled by a roller, which is raised when the quantity of hose upon the reel exceeds a predetermined amount. This clutch is also controlled by a grooved roller movable in a direction normal to its axis and over which the hose is drawn while being extended. The latter roller is associated with the clutch control mechanism in such a manner that, as the hose is being drawn outwardly, the roller will be raised to a position which actuates the clutch in such a manner that it is disengaged from the line shaft. A detent means associated with the clutch mechanism prevents movement of the grooved roller in the opposite direction when the hose line is permitted to become slack. When, however, the hose is subjected to a jerk and then permitted to go slack, the sudden movement of the roller by means of a novel arrangement, permits the roller to be released by the detent means, thus engaging the clutch associated with this particular roller. Simultaneously with the engagement of this clutch, the motor is started, thereby rotating the reel and retrieving the hose.

If it is wished to return the hose completely into the cabinet, the retrieving process instituted by jerking the hose is permitted to continue until the valve or other accessory at the outward end of the hose has been retrieved to its completely retracted position, at which time the clutch is disengaged and the motor stopped. If it is desired merely to retrieve a portion of the outstanding hose, the operator jerks the hose to engage the clutch and start the motor in the manner previously mentioned. After a portion of the hose has been rewound upon the reel and the slack thus taken up, the hose becomes tight, thus lifting the grooved roller, previously mentioned, which is operative to disengage the clutch and stop the motor. After the clutch has become disengaged and the motor stopped, the hose may be permitted to go slack and no further retrieving of the hose will follow until the hose is again given a slight jerk.

Referring to Fig. 4 of the drawings in which a plan view of a six reel cabinet is shown, it will be perceived that this cabinet is made up of a left-hand unit A, an intermediate unit B and a right-hand unit C. Each of these units contains two hose reels and they are substantially identical excepting for the sizes of the reels and excepting for the fact that the cabinet to the left is equipped with a motor 144 and associated mechanism for driving all of the hose reels. Beginning at the left, these hoses in order are indicated by the numerals 22, 24, 26, 28, 30 and 32, and respectively are connected at their outer ends to a water valve 34, an engine oil dispensing and measuring gun 36, a pair of gear oil dispensing and measuring guns 38 and 40, a high-pressure lubricating gun 42, and an air chuck 44. It will be appreciated that the particular sizes and types of hoses shown and the dispensing accessories attached to the ends thereof are given merely for purpose of illustration and that any one or all of these hoses and dispensing accessories could be replaced with hoses and accessories for other purposes.

Since each of the three individual units A, B and C is substantially like the others, a general description of the unit A will suffice, while the manner in which the other units differ from this unit will be pointed out as the description proceeds.

The framework of the unit A is comprised of a pair of upstanding generally rectangular side plates 46 and 48 secured at their lower ends by means of angle iron strips 50 to front and rear transversely extending channels 52. As best shown in Fig. 2, each of the units A, B and C is provided with side plates 46 and 48 and angle iron strips 50, although a single set of channels 52 extends beneath and connects together all of the separate units; similarly, the upper ends of the side plates 46 and 48 of the several units are connected together by a transversely extending box-like housing 54. This housing 54 adds rigidity to the structure and serves to house sets of grooved rollers 56 between which the hoses are drawn. A pair of these rollers 56 is provided in alignment with each of the hose reels to be described presently and serves to guide the hose as it is being withdrawn or retracted from the cabinet.

Directly above each set of these rollers, hose openings 57 are provided in the box-like structure 54 through which the hoses are drawn. Outwardly extending cuffs 58 surround these openings and support the dispensing accessories attached to the outer ends of the hoses in positions away from the face of the cabinet.

In a position somewhat above their mid-points, the side panels 46 and 48 carry a transversely extending shaft 60. The ends of the shaft are of reduced diameter and are threaded and rigidly secured to the panels by means of nuts 62.

Spaced inwardly somewhat from its ends, the shaft 60 journals a pair of reel hubs 64 and 66 in alignment with the slots 56. Each of these reel hubs is restrained against relative longitudinal movement by an annular internal flange 68 formed within the hub and which provides shoulders 69 that bear against the internal edges of annular packing retaining rings 70. Outwardly of the rings 70, the annular space between the shaft and hub contains a quantity of packing 71 confined by outer packing retaining rings 72. The innermost of the rings 72 abuts against a shoulder 73 on the shaft 60, while the outermost similar ring 72 is confined by a collar 74 keyed to the shaft 60 and spaced from the panels 46 and 48 by tubular spacing elements 75. Opposite the central portions of the hubs 64 and 66, the shaft has sections of reduced diameter forming annular recesses 76 between the shaft and hubs which communicate by means of intersecting bores 78 and 80 in the shaft with fluid supply conduits 82. Therefore, fluid under pressure in the conduit 82 passes through the intersecting bores 80 and 78, to the recess 76, and exerts pressure tending to force the rings 70 outwardly, thereby compressing the packing and sealing the junctures between the shaft and the hubs against leakage.

Both ends of the hubs 64 and 66 are secured to reel side plates 84 which extend outwardly and are spaced apart a distance slightly greater than the diameter of the hose to be stored upon the reel. At intervals the two side plates are connected together at points spaced outwardly somewhat from the hub by means of circumferentially arranged bolts 86 and tubular spacers 88. These tubular spacers 88 serve to support the innermost loop of the hose and in that capacity act as a drum upon which the hose is wound.

The inner end of the hose length 22 or 24 is connected by means of a suitable coupling to an L-shaped fitting 90 which extends inwardly and is threaded into a radially extending opening in the hub, which in turn communicates with the annular recess 76; thus fluid under pressure from the recess 76 passes outwardly through the fitting 90 and into the hose length wound upon the reel. The L-shaped fitting 90 is of such a length that its outward end, which is connected to the inner end of the hose length is in proper position so that the hose length extending at right angles therefrom will pass around the next adjacent tubular spacing element 88 without forming any substantial kink in the hose.

Each of the collars 74 is secured to the center of an outwardly extending spring metal arm 92. The two ends of these arms have friction brake shoes 94 which bear against the outer faces of the reel side plates and exert sufficient resistance to the rotation of the reels to prevent the reels from overrunning when the hose is being withdrawn therefrom.

The outer ends of the bolts 86 are threaded into bushings 96 which are attached to an annular sprocket 98 of comparatively large diameter. In a manner to be explained more fully presently, a chain 100 passed over this sprocket is used to drive the reel in retrieving the hose into the cabinet.

From the hose reel indicated generally by the numeral 102, the hose passes downwardly around an idling roller 104, thence downwardly and rearwardly around a control roller 106, thence upwardly and rearwardly between a pair of closely spaced rollers 108 mounted to rotate upon parallel axes, and thence upwardly and forwardly between the rollers 56 at the mouth of the opening 57.

Of the above described rollers, those numbered 104, 108 and 56, rotate about fixed axes, while, as will be described more fully presently, the roller 106 not only is rotatable, but also is movable in a direction normal to its axis.

It will be appreciated that this arrangement enables the hose to be freely withdrawn from the cabinet. It is necessary merely to seize the dispensing accessory attached to the end of the hose and pull outwardly, the hose passing around the above-mentioned rollers and rotating the reel 102 against the braking action of the brake shoes 94 as it is unwound.

The roller 106 is journaled to rotate upon a pin 110 projecting outwardly from a position near the lower end of an obliquely upwardly and forwardly extending control bar 112. In a position lower down upon the bar 112, another pin 114, similar to the pin 110, journals a second roller 116. This second roller is thus adjacent to and prevents the hose from slipping off the first roller 106. A pair of plates 118 and 120 are secured to the pins 110 and 114 on the two sides of the rollers and aid in giving rigidity to the roller mountings and also aid in confining the hose length to the groove in the roller 106.

The control bar 112 is positioned adjacent the inner face of the side plate 46 or 48, as the case may be, and is provided with a longitudinally extending slot 122 near its lower end, which is fitted to a rod 124. This rod extends transversely through the cabinet from side to side and is secured at its ends to the side plates 46 and 48.

At a mid-point in its length, the control bar 112 has a second longitudinally extending slot 126 through which the shaft 60 extends, while near its upward end in a position just below the top of the cabinet, a third longitudinally extending slot 128 embraces a pin 130 secured to the side wall of the cabinet. By means of this pin and slot mounting, the bar 112 is free to move longitudinally within limits, but is restrained against movement in other directions.

A switch bar 132 is located in the upper forward portion of the hose cabinet in a position just in front of the control bar 112 and is journaled to rotate in bearing members 133 attached to the cabinet sidewalls. This bar extends substantially the full length of the multiple hose cabinet and consequently its length is determined by the number of hose reels the cabinet contains. As will be seen in Fig. 4, which shows a cabinet containing 6 hose reels, this bar 132 extends from end to end of the cabinet and passes above and in front of each of the separate reels. At one end, a tilt type mercury switch 134 is secured to the bar 132 by means of a spring clip 136 so that angular displacement of the bar 132 will cause the mercury switch to tilt into either its on or off positions. A pin 138 projects radially downwardly from the bar 132 and has its outer end secured to one end of a coil spring 140, the opposite end of which is hooked to a stud 142 in the cabinet side panel. This spring is under tension and tends to pull the outward end of the pin 138 rearwardly and thus tends to tilt the mercury switch 134 into its off position. Since this switch 134 is in a series circuit with a motor 144, which supplies the motive power for driving the hose reels, the motor will not operate as long as this switch is in its off position.

Each of the control bars 112 is provided near its upward end with an inwardly extending U-shaped bracket 146. That is, one end of this bracket is secured to the upper end of the control bar 112 by a cap screw 148. Directly below this cap screw the bracket 146 is bent to extend outwardly at right angles to the bar 112 and extends in this direction a distance sufficient to carry this horizontal portion beyond the adjacent hose reel. At this point the bracket extends at right angles thereto downwardly parallel to the bar 112 into a position just beyond the rim of the hose reel. From this point, the bracket extends directly inwardly across the face of the hose reel and has its lower end secured to the bar 112 by a second cap screw 150. A control pin 152 is secured to and extends directly outwardly from the lower end of the vertical portion of the bracket 146. This pin 152 extends through a slot 154 in the free end of a control arm 156, which, at its opposite end, is bent into a U-shape at 157 and has aligned apertures therethrough through which the control shaft 132 extends.

Between the parallel arms of the U, the shaft 132 is provided with a flat spot 158, which faces generally away from the pin 154. An adjustable screw 160, held in place when adjusted by a lock nut 162 is threaded through the central portion of the U-shaped portion 157 in a position generally above the center of the shaft 132. This screw is not tightened against the flat spot 158 but is designed to provide sufficient lost motion between the end of this screw and the flat spot so that, as best shown in Fig. 12, any downward movement of the free end of the bar 156 from the position shown will cause the end of the screw 160 to abut against the flat spot 158 in a position above the center of the rod and cause the rod to turn in a counterclockwise direction. On the other hand, any upward movement of the free end of the arm 156 will move the end of the screw 160 away from the flat spot and permit sufficient lost motion so that the arm 156 can be pivoted in this direction a considerable distance without the end of the screw 160 causing movement of the bar 132 in a clockwise direction.

Since the end of the bar 156 embraces the pin 152 secured to the control bar 112, it will be seen that downward movement of any one of these control bars will cause its associated arm 156 to rotate the rod 132 in a counterclockwise direction against the tension of the spring 140, but because of the lost motion arrangement just described, this rotation of the shaft 148 will not be transmitted to any of the other control arms 156. Thus, when all of the control bars 112 are slid into their upward positions, the spring 140 will rotate the rod 132 and tilt the mercury switch 134 into its off position. On the other hand, if any one or more of these control bars 112 is permitted to move in a downwardly direction, the mercury switch will be tilted into its on position and will remain in its on position until all of the bars 112 are returned into their upward positions.

One means for shifting the bars 112 in an upwardly direction already has been described. This means consists of the rollers 106 around which the hose lengths pass, and associated mechanism. For instance, if it is considered that the bar 112 is in its downward position, and the hose length is in the act of being pulled from the cabinet, the braking action of the reel tending to hold back on the hose, together with the outward movement of the free end of the hose, will decrease the size of the loop in the hose between the rollers 104 and the rollers 106. This outward movement of the hose, therefore, will lift the roller 106 and urge the bar 112 upwardly. Similarly, if the end of the hose is held stationary and the motor is driving the reel by a means to be described presently and thus retrieving the hose, when the hose becomes taut, the roller 106 will be lifted in a like manner.

From this, it will be apparent that whenever the hose is being pulled from the cabinet and whenever the hose is being retrieved into the cabinet and becomes taut because the end of the hose is held and thus not permitted to move, the bar 112 will be shifted upwardly, and in the manner previously described, will tilt the mercury switch 134 into its off position and shut off the supply of energy to the motor 144.

Another means for shifting the control bar upwardly is controlled by the amount of hose wound upon the reel and is in general so adjusted that it opens the electric circuit to the motor whenever the hose is fully wound upon the reel. This device includes a roller 164 journaled to rotate about a pin 166, and positioned between the side plates of the reel so that as the reel fills with hose, eventually the hose will impinge against the roller and lift it upwardly. This roller is mounted within a recess 168 in a plunger 170, the side walls of which carry the pin 166, and the plunger is in turn slidably mounted within an externally threaded oval shaped member 172. Although the member 172 is above indicated as of oval shape, it may more properly perhaps be considered as an externally threaded cylinder, opposite faces of which are cut away so as to reduce the thickness of the member sufficiently so that it can be inserted between the side plates of the hose reel, while at the same time permitting a portion of the external threads to remain, by means of which the member can be adjustably secured to the bracket 146.

This member 172 extends through an opening 174 in the lower horizontal portion of the bracket 146 and is clamped in place therein by means of a pair of nuts 176 threaded to the external threads of the member 172. These threads are indicated by the numeral 178. By loosening one of these nuts and tightening the other, the vertical position of the member 172 relative to the bracket 146 can be determined.

A pin 180 press fitted at its ends in the member 172 extends transversely through a slot 182 in the plunger 170 and limits the upward and downward movement of the plunger relative to the member 172. A coil spring 184 located within a recess in the upper portion of the plunger 172 bears with its opposite ends against the plunger and against the upper portion of the member 172 and thus tends to urge the plunger downwardly. This spring is sufficiently stiff so that when the hose impinges against the roller 164 and pushes the plunger 170 upwardly, this movement will be transmitted through the spring and member 172 to the bracket 146 and bar 112 to open the motor circuit. Thus the spring acts principally as a safety device to prevent the parts from becoming stressed unduly during the interval of time required to stop the hose reel after the current to the motor is shut off.

The drive for the hose reels includes the before-mentioned electric motor 144 which is connected by means of a V-belt 190 to a pulley 192. The pulley 192 is in turn keyed to one end of a line shaft 194 that extends through all of the units of the hose cabinet and is journaled to rotate in bearings 196 positioned about the shaft where it passes through each of the side panels.

Within each of the units the shaft 194 extends through a sleeve 198 which carries certain members to be described presently and which is driven by the shaft 194 through the medium of a key 200, held in place by a cap screw 202.

At its left-hand end, as seen in Fig. 3, the sleeve 198 is provided with a sprocket 204 which drives the previously mentioned roller chain 100. The sprocket 204 is free to rotate relative to the sleeve 198 and is driven from this sleeve by a clutch, indicated generally by the numeral 206, as best shown in Fig. 8. The clutch driven member 208 is mounted to rotate with the sprocket 204 and carries a pair of outwardly radiating wings 210. When engaged, these wings are driven by a pair of knobs 212, which extend outwardly toward the left from a clutch driving member 214. This clutch driving member 214 is formed as a portion of a collar 216 slidably mounted upon the sleeve 198 but prevented from rotating relative thereto by a key 218. Therefore, when the collar 216 is shifted toward the left, the clutch will be engaged and the motor 144 will drive the sprocket 204 and in turn the reel 102.

A clutch shifting fork 220 extends into an annular groove 222 in the collar 216 and has its opposite end connected to a shifting member 224. This shifting member 224 is slidably mounted upon the bar 124 previously mentioned. A collar 226 is secured to the bar 124 in a position inwardly from the member 224 by means of a cotter pin 228 and serves to confine one end of a compression spring 230 coiled about the bar 124 and bearing with its opposite end against the inner end of the shifting member 224. This spring tends to urge the shifting member toward the left into clutch engaging position.

Somewhat to the left of the shifting fork 220, the shifting member 224 is provided with a pair of oppositely disposed horizontally transversely extending pins 232. Each of these pins is provided with a roller 234 held in place by washers 236, and cotter pins 238 which extend through apertures positioned near the outward ends of the pins. These rollers bear against a pair of cam faces 240 formed upon a cam 242 secured to the lower end of the control bar 112.

The profile of this cam, which is best shown in Fig. 3, is so shaped that when the control bar 112 is in its downward position, the upper portion of the cam face, which in that position is in contact with the rollers 234, permits the roller to move to the left sufficiently to permit the spring 230 to engage the clutch 206. Below this point the cam face slopes obliquely to the right so that as the cam is lifted by upward movement of the control bars, the cam face will cause the rollers 234 to move to the right sufficiently to disengage the clutch 206. Just below this point, the cam face is formed with a re-entrant portion which acts as a detent 243 to prevent the bar 112 from moving downwardly. That is, as the bar 112 and cam 242 move upwardly, the rollers 234 will be moved toward the right until the re-entrant portion of the cam face is reached. Whereupon the spring 230 will move the rollers 234 slightly to the left to act as detents resisting downward movement of the control bar 112. This movement to the right, however, into the re-entrant portion, is not sufficient to permit engagement of the clutch 206. Just below the detent portion, the cam face again slopes obliquely outwardly toward the right to form a surface which urges the rollers 234 still farther to the right as the cam and bar 112 are lifted upwardly beyond the detent portion.

The pressure of the spring 230 is so adjusted that when the rollers 234 are in the detent portion 243, the bar 112 will be maintained in its upward position. That is, the weight of the bar and its associated mechanism tending to force the rollers 234 to the right is not as great as the pressure of the spring 230. On the other hand, if the bar 112 is lifted still higher so that the rollers 234 impinge against the portion of the cam face somewhat beyond the detent portion and then the bar 112 is released and permitted to drop, the inertia of the dropping bar is sufficient to carry the cam detent portion beyond the rollers and thus permits the bar to drop into its lowermost position. Therefore, if the hose is pulled outwardly at the normal rate, the bar 112 will be lifted in the manner previously described until the rollers 234 engage the detent 243. In fact, the bar may be lifted somewhat beyond this point so that the rollers pass beyond the detent means. In either event, after the hose has been withdrawn and is permitted to go slack, the bar 112 will settle at a comparatively slow rate and permit the rollers 234 engaging in the detent 243 to support the weight of the rod. If, however, the hose is jerked suddenly, the bar 112 will be raised sufficiently so that the cam will move upwardly into a position such that the rollers 234 are well beyond the detent 243. When the hose is suddenly permitted to go slack at the end of the jerk, the bar 112 will fall rapidly and its inertia will carry the detent portion 243 beyond the rollers 234 and permit the bar to go into its lowermost position. In a manner previously described, this movement of the bar 112 into its lowermost position causes the clutch 206 to be engaged, thereby causing the motor 144 to rotate the reel and retrieve the hose.

Although in the above description of the left-hand clutch and control mechanism associated therewith, I have frequently referred to parts as being to the right or left, it will be understood that adjacent hose reels and the controls and operating mechanism associated therewith are in general reverse complements of each other.

In order to protect the clutches and shifting mechanism at the lower portions of the cabinets, these elements are partially enclosed within a sheet metal structure 246 which also serves as an oil pan and which is provided near its central portion with a drain plug 248.

Referring to Fig. 1, it will be seen that the lubricant conduits 82 enter the cabinet near the lower rear portion and pass generally upwardly and inwardly to positions where they are connected to the shafts 60. In order to avoid crowding, some of these conduits pass upwardly a short distance and then obliquely upwardly and inwardly while others pass upwardly to a higher position and then are curved over in a loop and are attached to the upper surface of the shafts 60. Illustrated also in this figure is an electric cord 250 for energizing the motor and having a plug 252 at its free end. This cord passes inwardly through the lower front edge of the cabinet and then passes upwardly through an armored conduit 254 to an outlet box 256. Within the box 256 connections are made so that one wire passes to the mercury switch 134 while the return wire from the mercury switch, together with the other wire from the conduit 254 pass downwardly through a second armored conduit 258 to the motor 144.

From the above description of a preferred embodiment of my invention, it will be seen that I have provided a device which accomplishes the objects set forth at the beginning of the specification. A hose cabinet embodying the present invention is very convenient in use and requires a minimum of special operations on the part of the user in order to exercise control over its operation. When it is wished to withdraw a hose from the cabinet, it is necessary merely to take hold of the accessory at the end of the hose and walk away from the cabinet. Any slack that develops in the hose length during use of the dispenser at the end thereof will not cause the hose to be retrieved into the cabinet. However, at any time it is desired to re-wind the hose, it is necessary merely to subject the hose to a jerk.

After the hose has been retrieved into the cabinet, the clutches will be disengaged and the motor stopped when the roller 164 is raised by the accumulating hose upon the reel. At any point in the retrieving process this action can be stopped by holding the hose until the slack has been taken up, whereupon the clutch will be disengaged and the motor stopped in a manner previously described in detail.

Having described my invention in connection with a preferred embodiment thereof, what I claim as new and useful and desire to secure by Letters Patent of the United States is:

1. A hose reeling apparatus comprising a plurality of rotatable hose reels, a common drive shaft for said reels, means to rotate said drive shaft, individual clutch means associated with each of said hose reels and adapted for coupling said hose reels selectively to said drive shaft, hoses attached to said hose reels and adapted to be wound thereon, and control means for each of said reels actuated by the hose attached to the respective reel for engaging the clutch means associated with the respective reel when the hose is moved outwardly relatively suddenly and then is permitted to go slack.

2. A hose reeling apparatus comprising a plurality of rotatable hose reels, a common drive shaft for said reels, means to rotate said drive shaft, individual clutch means associated with each of said hose reels and adapted for coupling said hose reels selectively to said drive shaft, hoses attached to said hose reels and adapted to be wound thereon, control means for each of said reels actuated by the hose attached to the respective reel for engaging the clutch means associated with the respective reel when the hose is moved outwardly relatively suddenly and then is permitted to go slack, and means associated with said control means and adapted to stop the rotation of said common drive shaft when the reel has filled with hose to a predetermined point.

3. A hose reeling apparatus comprising a plurality of rotatable hose reels, a common drive shaft for said reels, means to rotate said drive shaft, individual clutch means associated with each of said hose reels and adapted for coupling said hose reels selectively to said drive shaft, hoses attached to said hose reels and adapted to be wound thereon, control means for each of said reels actuated by the hose attached to the respective reel for engaging the clutch means associated with the respective reel when the hose is moved outwardly relatively suddenly and then is permitted to go slack, but adapted to move said clutch means to uncoupled position when said respective hose is moved outwardly less suddenly and then is permitted to go slack.

4. A hose reeling apparatus comprising a plurality of rotatable hose reels, a common drive shaft for said reels, means to rotate said drive shaft, individual clutch means associated with each of said hose reels and adapted for coupling said hose reels selectively to said drive shaft, hoses attached to said hose reels and adapted to be wound thereon, control means for each of said reels actuated by the hose attached to the respective reel for engaging the clutch means associated with the respective reel when the hose is moved outwardly relatively suddenly and then permitted to go slack, and means associated with said control means and adapted to stop the rotation of said common drive shaft when all of said clutch means are disengaged.

5. A hose reeling apparatus comprising a plurality of rotatable hose reels, a common drive shaft for said reels, means to rotate said drive shaft, individual clutch means for each of said hose reels adapted for coupling said hose reels selectively to said drive shaft, hoses attached to said hose reels and adapted to be wound thereon, control means actuated by said hoses for engaging the clutch associated with the hose reel to which the hose is attached when the hose is moved outwardly suddenly and then permitted to go slack, and friction brake means to prevent overrunning of said hose reels.

6. In a hose reeling device, a hose reel, a drive shaft for said hose reel, an intermediate drive member for said hose reel, clutch means to couple the intermediate member to the drive shaft for the purpose of driving said hose reel from said drive shaft, a clutch shifting member associated with said clutch means and adapted when in one position to cause engagement of said clutch, and when in a second position to bring about disengagement of said clutch, means to shift said shifting member into the said second position when a predetermined quantity of hose has been wound upon said hose reel, and means to shift said shifting member into the said one position when said hose is moved outwardly suddenly and then permitted to go slack, and means to prevent the last said shift from taking place unless movement permitting the hose to go slack is immediately preceded by a relatively sudden outward movement of the hose.

7. In a hose reeling device, a hose reel, a drive shaft for said hose reel, means to rotate said drive shaft, an intermediate drive member for said hose reel, clutch means to couple the intermediate member to the drive shaft for the purpose of driving said hose reel from said drive shaft, a clutch shifting member associated with said clutch means and adapted when in a first position to cause engagement of said clutch, and when in a second position to bring about disengagement of said clutch, means to shift said shifting member into the said second position when a predetermined quantity of hose has been wound upon said hose reel, means adapted for actuation by the last said means when shifting said shifting member into said second position to cause the rotation of said drive shaft to cease, and yieldable means for urging the clutch shifting member to said first position, the force applied by said yieldable means being insufficient to arrest movement of the said means to shift said shifting member when it is moved rapidly as a result of a sudden increase and reduction in the tension applied to said hose.

8. In a hose reeling device, a plurality of hose reels, independent drive members for said hose reels, a common drive member for all of said hose reels, a plurality of clutches for selectively connecting said common drive member to said individual drive members, control means associated with said clutches and adapted to engage and disengage said clutches, an electric motor for driving said common drive member, switch means adapted to close or open an electric circuit to energize said motor, and means associated with said switch means and said control means to shift said switch means to open circuit position when all of said clutches are disengaged.

9. In a hose reeling device, a plurality of hose reels, independent drive members for said hose reels, a common drive member for all of said hose reels, a plurality of clutches for selectively connecting said common drive member to said individual drive members, control means associated with said clutches and adapted to engage and disengage said clutches, an electric motor for driving said common drive member, means adapted to complete an electric circuit to energize said motor when any one of said clutches is engaged.

10. A hose reeling apparatus comprising a rotatable hose reel, a hose connected at one end to said reel and adapted to be wound thereon, a supporting structure for said reel, the hose extending from said reel and through an opening in said supporting structure and forming a loop within said supporting structure between the hose reel and the said opening, rotatable reel driving means, means for connecting said driving means to the hose reel to rotate the latter, means to control the operation of the connecting means, and the said control means including a substantially vertically disposed slidably mounted member, said member having means engaging said loop of said hose and being adapted to be raised upon a decrease in the size in said loop and to be lowered upon an increase in the size of said loop.

11. A hose reeling apparatus comprising a rotatable hose reel, power means to rotate said reel, clutch means adapted for coupling said hose reel to said power means, a hose attached to said hose reel and adapted to be wound thereon, control means for said reel actuated by said hose for engaging said clutch means when the hose is moved outwardly relatively suddenly and then is permitted to go slack, said control means comprising a member having a part engaging a portion of said hose and movable thereby as a result of a change in tension in said portion of said hose, a clutch means operating element cooperating with said member and operable to cause engagement of said clutch means upon a sudden reduction in the tension applied to said means, said control means including restraining means engaging said clutch means operating element to prevent engagement of said clutch means upon a gradual reduction in the hose tension, said restraining means being ineffective to prevent operation of said clutch means operating element upon a sudden reduction in the tension applied to said hose.

12. A hose reeling apparatus comprising a rotatable hose reel, means to rotate said hose reel, clutch means adapted for coupling said hose reel to said rotating means, a hose attached to said hose reel and adapted to be wound thereon, clutch control means actuated by said hose adapted to engage said clutch when said hose is jerked, and means to hold said clutch in disengaged condition when said hose is being pulled outwardly from said reel and when said hose is permitted to go slack unless slack movement of said hose is immediately preceded by a jerk on said hose, said last named means including a member moving in one direction upon release of tension in said hose, and an element yieldingly cooperable with said member to limit the extent of such movement thereof unless the momentum of said member is sufficient to overcome the force yieldingly applied throughout by said element.

MARCEL GARANCHER.